United States Patent [19]

Waitzman

[11] Patent Number: 4,598,885
[45] Date of Patent: Jul. 8, 1986

[54] AIRPLANE AIRFRAME

[76] Inventor: Simon V. Waitzman, 57 Montague St., Brooklyn Heights, N.Y. 11201

[21] Appl. No.: 17,684

[22] Filed: Mar. 5, 1979

[51] Int. Cl.⁴ .......................... B64C 1/26; B64C 3/54; B64C 3/58; B64C 39/10
[52] U.S. Cl. ...................................... 244/13; 244/36; 244/45 R; 244/91; 244/199; 244/218; 244/130
[58] Field of Search ...................... 244/45, 46, 36, 91, 244/7 C, 106, 213, 35 R, 214, 117 R, 199, 218, 130, 49, 13, 105, 100 R, 12.1, 12.3, 37; 180/126

[56] References Cited

U.S. PATENT DOCUMENTS

| | | | |
|---|---|---|---|
| D. 130,650 | 12/1941 | Silverstein | 244/45 R |
| D. 200,825 | 4/1965 | Grebe | 244/213 UX |
| 1,775,861 | 9/1930 | Lehberger | 244/7 C |
| 1,779,005 | 10/1930 | Lanier | 244/13 |
| 1,803,805 | 5/1931 | Lanier | 244/45 R |
| 1,845,520 | 2/1932 | Robinson | 244/130 |
| 2,448,075 | 8/1948 | Bortner | 244/106 |
| 2,575,185 | 11/1951 | Mulholland | 244/35 R |
| 2,925,233 | 2/1960 | Dunn et al. | 244/218 |
| 3,082,981 | 3/1963 | Gruen | 244/218 |
| 3,083,935 | 4/1963 | Piasecki | 244/218 |
| 3,152,775 | 10/1964 | Boyd | 244/45 R |
| 3,278,141 | 10/1966 | Wolcott | 244/45 R UX |
| 3,429,527 | 2/1969 | Whittley | 244/12.3 |
| 3,462,100 | 8/1969 | Valroger | 180/126 |
| 3,486,577 | 12/1969 | Jackes | 244/12.1 |
| 3,625,459 | 12/1971 | Brown | 244/36 |
| 3,845,918 | 11/1974 | White, Jr. | 244/91 |
| 3,848,831 | 11/1974 | Geary | 244/45 R |
| 4,172,574 | 10/1979 | Spillman | 244/199 |

FOREIGN PATENT DOCUMENTS

| | | | |
|---|---|---|---|
| J 9693 | 9/1956 | Fed. Rep. of Germany | 244/199 |
| 2149956 | 4/1973 | Fed. Rep. of Germany | 244/199 |
| 1168084 | 12/1958 | France | 244/36 |
| 283980 | 1/1928 | United Kingdom | 244/12.1 |

OTHER PUBLICATIONS

Gulfstream III, Gulfstreamer, vol. 5, No. 6, Winter 1976.

Primary Examiner—Galen L. Barefoot
Attorney, Agent, or Firm—Simon V. Waitzman

[57] ABSTRACT

An airplane airframe having wings connected to the fuselage by spars of smaller cross section than the wings. Movable winglets may be provided at the outboard ends of the wings. The fuselage may be an airfoil shaped lifting body structure with longitudinal splines at its edges. The splines may be movable in flight, and may be provided with flaps which are also movable in flight so that the splines can be readjusted to alter the aerodynamic characteristics of the airframe during flight. The undersurface of the fuselage may include cambers symmetrical about the center plane of the fuselage.

72 Claims, 5 Drawing Figures

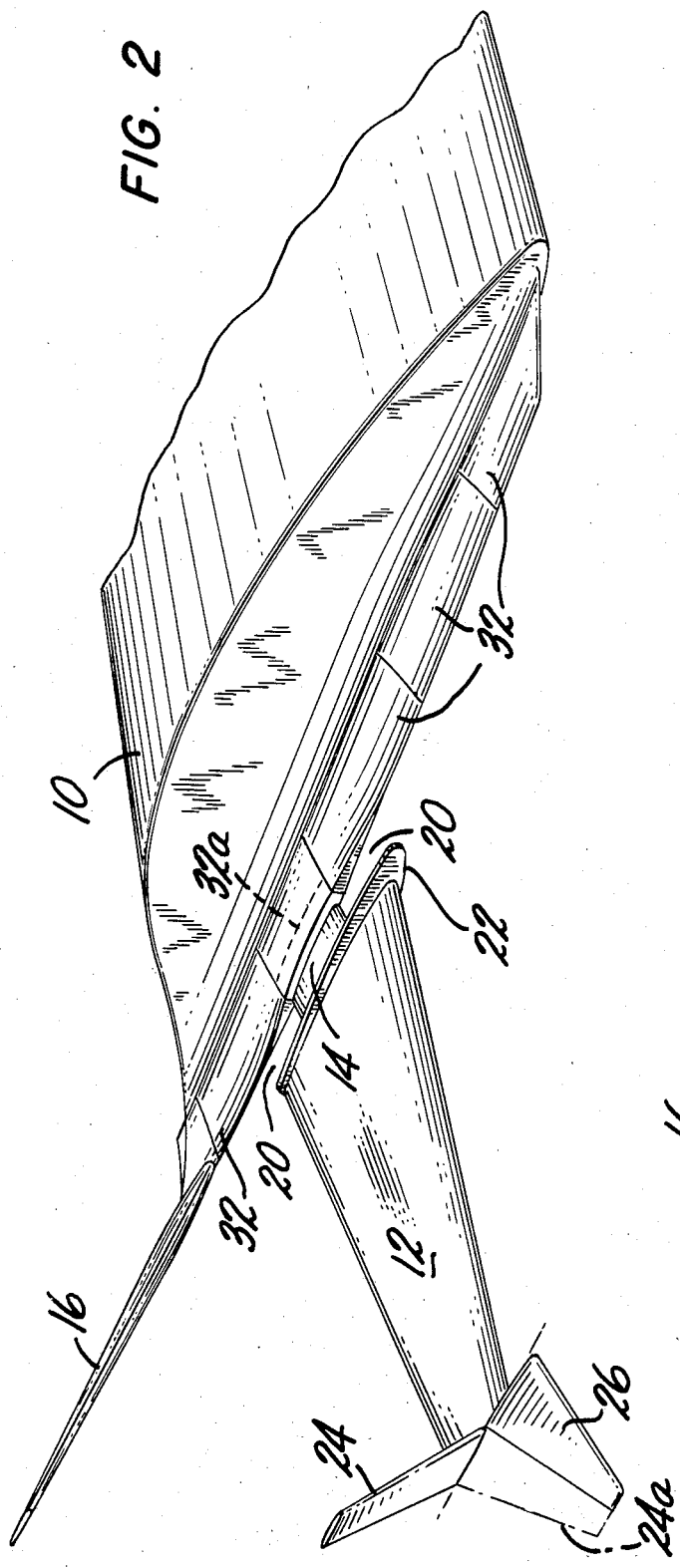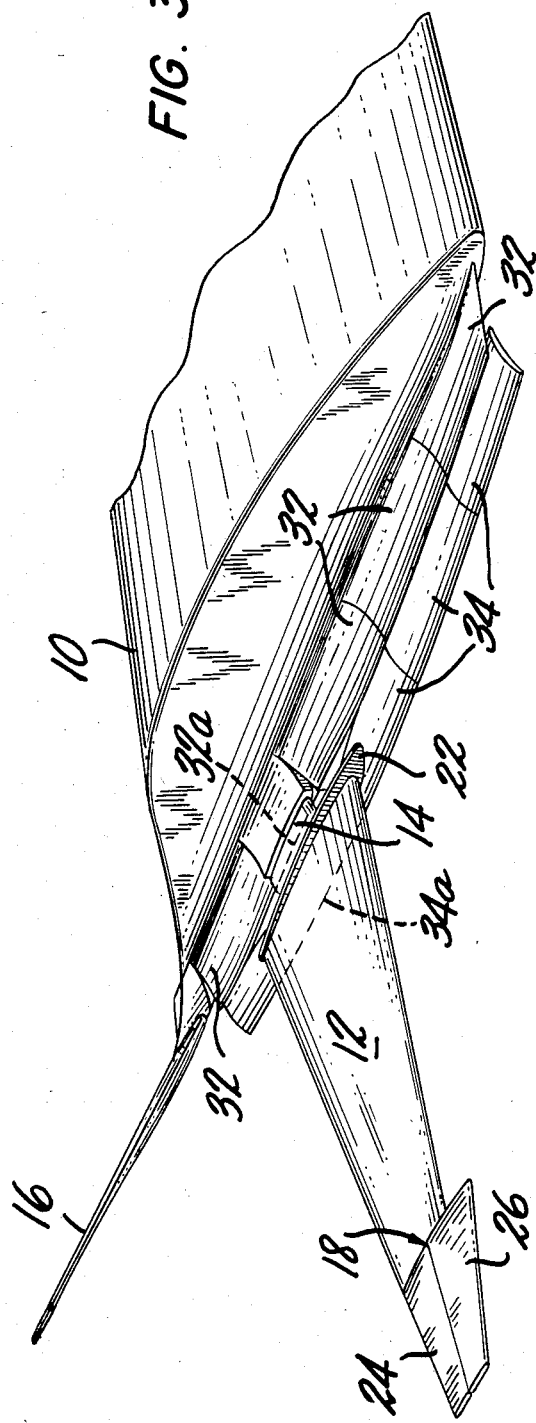

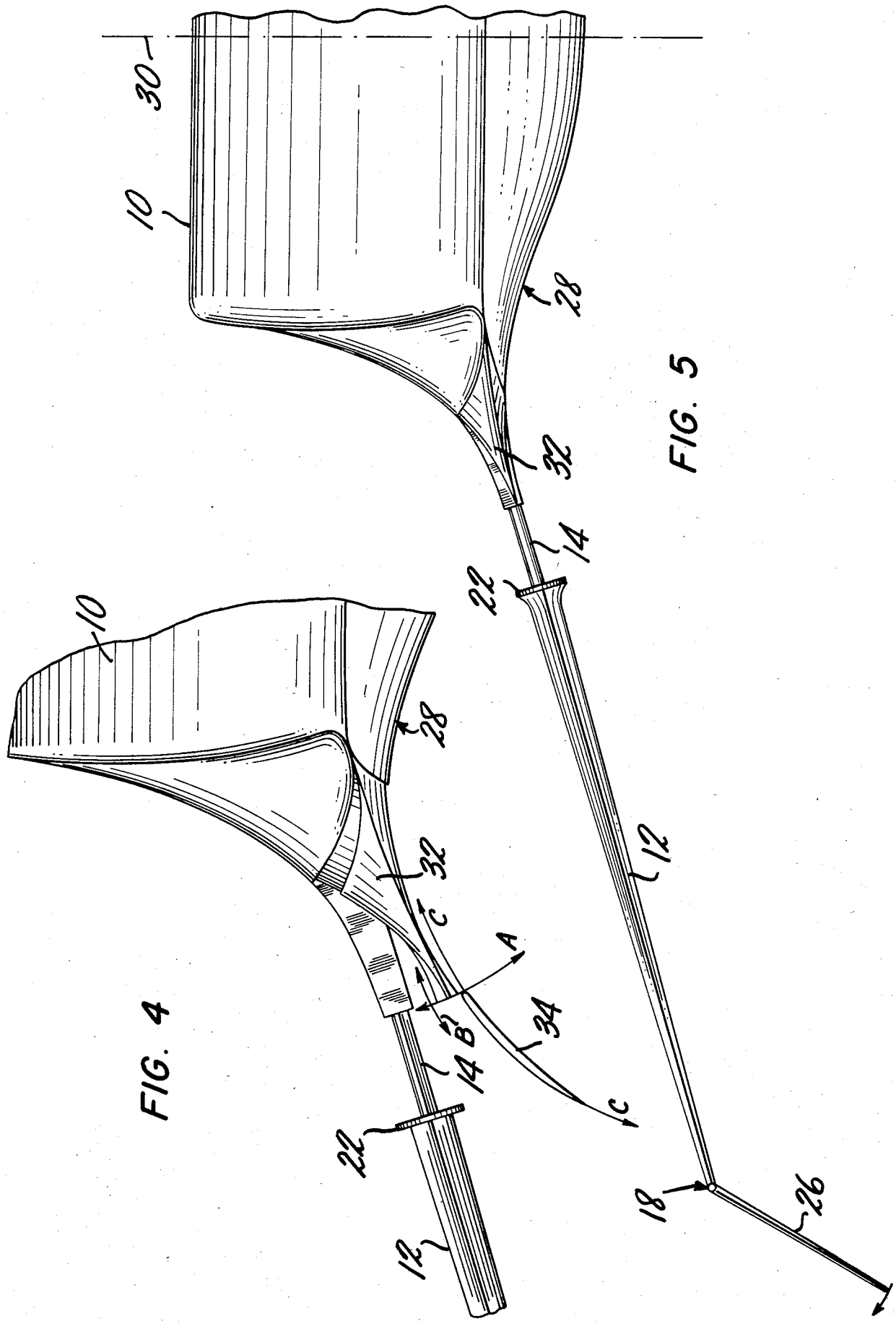

AIRPLANE AIRFRAME

BACKGROUND AND SUMMARY

The present invention relates to the aerodynamic configuration of an airplane airframe. Conventionally, and with rare exceptions (primary among which is the "flying wing"), airplanes consist of a fuselage, wings attached thereto and an empennage.

It has long been recognized that in producing lift and propelling an airplane through the air, certain drag forces are created. As the speed of an aircraft increases, the magnitude of the drag forces increases enormously. Drag is composed primarily of two components: induced drag and parasite drag. Parasite drag is caused by factors such as skin friction and airstream disturbing forms, for example, antennas, cowl openings and landing gear and airflow interference between components of the airframe, such as at the junction of wing and fuselage or fuselage and tail. Parasite drag is a function of air speed, i.e., increasing as the square of the air speed. Induced drag, on the other hand, varies inversely with air speed. In order to overcome the increased total drag, due primarily to greatly increased drag encountered at high speeds, greater power is required. These increased power requirements necessitate larger, more powerful engines which, in turn, require the carrying of increased quantities of fuel. The larger fuel loads also increase the gross weight of the aircraft thereby making further demands upon the power supply.

Modern aircraft design efforts have, therefore, concentrated very heavily upon minimizing drag. One of the areas on an airplane long known to cause drag problems has been the intersection between the wing and the fuselage. Among other things, the discontinuity at that point tends to cause turbulence and drag. One attempt to eliminate or at least minimize the turbulence generated at this intersection has been to flare the wing root so that the transition from fuselage to wing, particularly along the leading edge of the wing, is less abrupt. See, for example, Brownell, U.S. Pat. No. 2,927,749.

It has also been found that turbulence is created at the wing tips, in the form of wing tip vortices. Since, in flight, the air pressure below the wing is greater than that found above the wing (the Bernoulli Principle), air at the wing tip tends to flow from the high pressure to the low pressure zone. Thus, in addition to longitudinal flow of air from the leading to the trailing edge of the wing, there is also a component of lateral flow. It has been found that this lateral flow and the wing tip vortices are responsible for a significant amount of the overall drag of the aircraft in flight. This is of particular importance for aircraft which cruise near or above trans-sonic speeds.

One attempt to minimize the problems created by wing tip vortices has been the development of "winglets". Reference to such appendages can be found, for example, in various issues of *Aviation Week & Space Technology*, including Oct. 3, 1977 (page 16), Oct. 10, 1977 (cover), Mar. 6, 1978 (pages 9 and 14), and Mar. 16, 1978 (page 13). A discussion of winglets can also found in the article beginning on page 35 of the Sept. 1978 issue of *PILOT*, the official publication of the Aircraft Owners and Pilots Association (AOPA). Another approach to solving the wing tip vortexing problem has been to use a swept-forward wing. The spanwise flow along such wings tends to be toward the fuselage, not toward the wing tip.

In aircraft design, numerous approaches have been made to maximize lift. Toward this end, some designs have incorporated lifting body fuselages. As used herein, a lifting body fuselage is one that has any airfoil shape with a low aspect ratio (the ratio of span to chord) relative to those characteristic of conventional wings. Examples of lifting bodies will be found in U.S. Pat. Nos. 1,928,317, 2,864,567, 2,989,269, 3,576,300, 3,684,217, 3,743,218 and 3,869,102.

When an airplane moves through the air, the displacement of air by the various components causes increased pressure in the regions immediately adjacent the airplane skin. Thus, the static air pressure immediately above the wing is greater than the static air pressure at some distance from the surface where the air remains undisturbed. This also holds true around the fuselage. It can therefore be seen that at the junction of the wing and the fuselage there is a convergence of two relatively high pressure areas. This convergence of the two zones tends to cause turbulence and increased drag over the entire length of the junction. In addition, the junction tends to disturb smooth airflow which also leads to turbulence.

In my invention I substantially reduce this turbulence and the attendant drag by separating the wing from the fuselage. The wing is connected to the fuselage through an intervening airfoil-shaped spar of substantially decreased cross sectional area from that of the adjacent wing section. Preferably, the spar should be symmetrical about its horizontal center plane. The two high pressure zones caused by the displacement of air by the wing and by the fuselage are separated by use of the spar and the turbulence caused by their convergence substantially reduced. Additionally, due to the shorter chord length of the spar the junction between spar and fuselage has been foreshortened resulting in a shorter zone of airflow disturbance. In my preferred embodiment, airstream disturbance is further reduced by orienting the spars so as to provide 0° angle of incidence.

There are examples in the prior art of airframes wherein the wings have been separated from the fuselage. See, for example, U.S. Pat. Nos. 1,779,005 (Lanier), 1,913,809 (Lanier) and 2,186,558 (Rousnet). The structures shown and the purposes to be served by the structures shown in those patents are, however, quite different from those contemplated by the instant invention. For example, in my invention I connect the wing to the fuselage through a single airfoil-shaped spar to reduce turbulence and drag. In the Lanier patents no consideration appears to have been given to reducing turbulence. This is evident from the fact that the wings are joined to the fuselage by use of multiple spars, none of which appear to have an airfoil shape. Such structure tends to produce more, not less, turbulence. In the the '558 patent, while a discontinuity is provided, it is to enable the wing to pivot when acted upon by certain aerodynamic forces. There is no teaching that the separation would serve any of the purposes contemplated by the instant invention.

Another reference of interest is U.S. Pat. No. 1,965,790 which shows a wing having a reduced chord and thickness immediately adjacent the fuselage. This is provided, however, to increase the pilot's view both forward and down, not to serve any aerodynamic function.

Other patents which are of only peripheral interest in this connection are U.S. Pat. Nos. 3,123,321 and 2,065,401.

None of the above references show the wing/spar/fuselage structure contemplated by the instant invention nor would the structures shown in any of those, either alone or in combination, serve the purposes which my invention serve.

My invention also contemplates use of winglets at the wing tips to minimize the generation of vortices and lateral flow of air toward the end of the wing. Unlike previous designs, however, my winglets can be moved in flight. In cruise configuration they serve primarily to minimize wing tip vortices without substantially increasing induced drag. The geometry and positioning of these winglets in cruise are selected to minimize parasite drag as well. In the landing configuration they are substantially horizontal and become an extension of the wing, thereby providing increased wing area and decreased wing loading.

The Feb. 19, 1979 issue of *Aviation Week & Space Technology* shows a picture of a model airplane with what appear to be variable wing tips. It is said that the model "has variable geometry anhedral to explore means of aleviating excessively high dihedral." Thus, it would appear that the purpose these wing tips were designed to serve is quite different from the purpose served by my moveable winglets. Moreover, it is not even clear from the limited description in *Aviation Week & Space Technology* that the variable wing tips are moveable in flight, as opposed to being variable from one wind tunnel test to another.

Since the wing in my invention is separated from the fuselage, lateral flow inwardly along the wing near its wing root would be likely to occur for the same reasons that lateral flow occurs at the wing tip. I have therefore provided wing fences at the fuselage end of the wing, where the wing joins the spar.

My design also contemplates a lifting body fuselage. Once again, however, the differential pressure between the air above the lifting body and that below, along the longitudinal edges of the lifting body, tend to produce votices and turbulence similar to that found at wing tips. I have therefore provided longitudinal splines along the lifting body to minimize these effects and the attendant drag. The angle at which these splines join the fuselage can be made variable, they can be made extenable out from the fuselage and they can, in addition, incorporate longitudinal flaps. It is anticipated that full extension of the splines and flaps in the landing configuration will provide substantially increased lift at that critical stage in the flight. Moreover, the turned down flaps and splines in the landing configuration tend to inhibit vortexing, an increasingly important feature as the angle of attack of the lifting body becomes more pronounced. These variable splines and/or flaps can also be employed singly or in unison during normal flight operations to improve the maneuverability envelope.

While each of the above features can be used independently of the others, the most efficient design would incorporate all of them. In that preferred embodiment one would achieve the cooperative benefits of reduced drag during cruise coupled with increased lift.

The airframe design described herein incorporates the above features to produce an airplane having substantially improved aerodynamic characteristics over airplanes of the prior art. Drag is reduced, particularly in the high sub-sonic, transsonic and supersonic ranges and lift is increased both in normal flight, including climb, descent and cruise, and especially during landing.

BRIEF DESCRIPTION OF DRAWINGS

For a thorough understanding of the nature and features of the invention, reference should be had to the following detailed description taken in conjunction with the accompanying drawings in which:

FIG. 2 is a perspective view of the right side of the airplane airframe of FIG. 1 in the cruise configuration;

FIG. 3 is a perspective view of the right side of an airplane airframe as contemplated by the invention showing splines, flaps and winglets in the landing/take-off configuration;

FIG. 4 is a detail front elevation view showing splines and flaps extended in the landing/take-off configuration;

FIG. 5 is a front elevation view showing an alternative wing fence and winglets in the maximum speed configuration.

In the drawings, like reference numerals have been employed to refer to like parts throughout.

DETAILED DESCRIPTION

Figure 1:
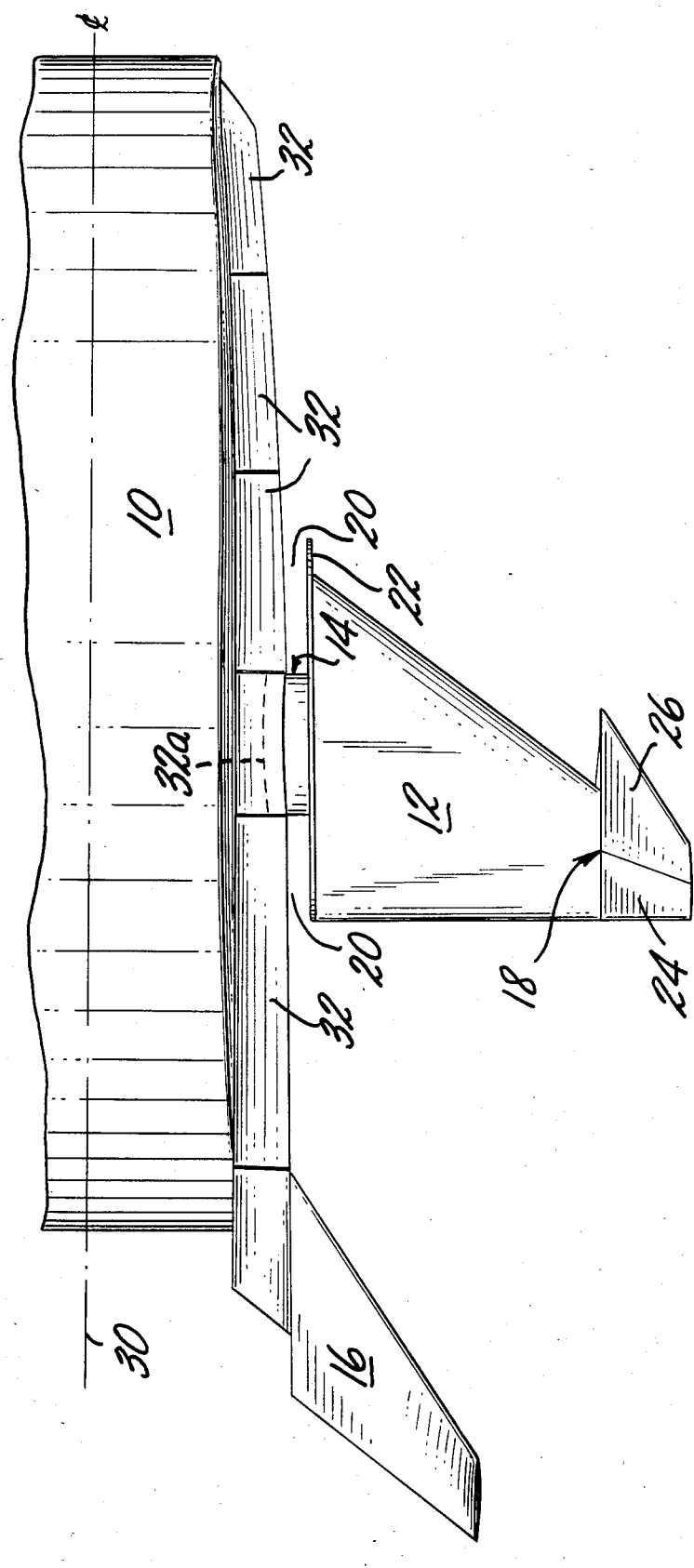
FIG. 1 is a top plan view of the right half of an airplane airframe embodying the several elements of the invention.

The preferred embodiment of the airplane airframe of the subject invention is comprised of a fuselage 10, wings 12, spars 14 intervening between each wing and the adjacent fuselage section, empennage 16 and wing tip winglets 18.

As can be seen in FIG. 2, the height of each section of each spar 14 is substantially less than the height of the adjacent section of wing 12 and the maximum height of the spar is much less than the maximum height of the wing at its root. As a result, the non-fuselage generated compression at the intersection of the spar and the fuselage is substantially less than would be encountered if the wing itself joined the fuselage.

It will also be seen that the chord length of the spar is much less than the chord length of the immediately adjacent wing section. By shortening the chord length the longitudinal distance over which there is increased pressure and smooth airflow disturbance due to the junction is significantly reduced. This tends to decrease the amount of turbulence and the area over which it acts and hence reduces drag. Although the drawings show an abrupt change, i.e., a discontinuity in chord length at the spar/wing junction, an alternative embodiment would provide a wing that tapers gradually from the leading and trailing edges to the spar. Similarly, another embodiment would have the wing thickness taper as it approaches the spar. The junctions of the spar with the fuselage and with the wing root can be designed to take advantage of the area rule considerations.

In order to withstand the bending and twisting moments at the wing root, the spars must be of substantial strength. It might therefore be advantageous to use a titanium alloy or some of the more modern composite materials, for example, those which incorporate boron or graphite filaments. Once again, it should be emphasized that the various features described above can be used independently. However, the cooperative effects of the combination provide substantial benefits. For example, employing a lifting body fuselage geometry tends to lessen wing loading and therefore the bending and twisting moments the spars have to withstand. It also reduces the required wing area.

In flight, an airplane stays aloft at least in part due to the Bernoullian effect, i.e., as a result of the pressure differential between the air above the wing and the air below the wing. It is well known that this pressure differential tends to cause vortices at the wing tips where the low pressure and high pressure zones meet and produce a pressure gradient. Heretofore, this has never been a problem at the wing root because direct attachment of the wing to the fuselage keeps the high and low pressure zones apart. With my invention, however, the separation of the wing from the fuselage, as at 20, would tend to allow the formation of votices at the wing root similar to those previously found only at wing tips. In order to prevent or substantially minimize the lateral flow which tends to produce vortex turbulence of this sort, I have incorporated wing fences, 22. Such fences need not take the form of perpendicular plates, as shown. For example, they may be flared to eliminate the abrupt discontinuity where the fence meets the wing.

Similarly, winglets are provided at the wing tips to prevent or at least ameliorate vortex turbulence. I have employed bifurcated winglets; the primary winglet 24 at the trailing edge of the wing and secondary winglet 26 at the leading edge. Unlike the winglets of the prior art, however, the winglets contemplated by this invention are movable in flight. FIG. 2 shows the winglets in cruise configuration: primary winglet 24 up and secondary winglet 26 down. In that configuration parasite drag is minimized and so too is wing tip vortex turbulence. Hence, induced drag, particularly in the high sub-sonic, transsonic and supersonic speed ranges, is significantly reduced and the cruise range of the aircraft increased.

In addition, primary winglet 24 can be made pivotable to a downward configuration as shown by dashed line 24a of FIG. 2. In maximum speed configuration, both primary and secondary winglets are aligned, preferably downwardly, but alternatively, upwardly, with zero angle of incidence.

Since during landing and taking off increased lift is much more important than reduced drag, I have designed the winglets so that they can be pivoted to a position in or substantially parallel to the chord-plane of the adjacent wing thereby increasing the effective wing area and the amount of lift the wings can generated. In that configuration they in effect, extend the wingspan and decrease the wing loading.

My invention also contemplates an airfoil-shaped, lifting body fuselage. Any state of the art airfoil shape can be employed. In fact, a super critical wing configuration would likely offer particularly advantageous characteristics. A lifting body is equivalent to a short wing having a low aspect ratio whereby some of the lift required to counteract the effect of gravity is supplied by the fuselage itself. However, since induced drag is well known to be the sine qua non of lift, it is desirable that the configuration of the fuselage provide more than sufficient lift to overcome the detrimental effects of the induced drag generated.

I have also provided a unique underside configuration for the fuselage. A deep longitudinal camber 28 is provided on each side of the center line 30 of the fuselage. This camber tends to lessen turbulence and vortexing during high speed flight and to increase lift resulting from Newtonian effects at high angles of attack, such as in the landing configuration.

In lateral profile, as seen in FIG. 5, each camber 28 terminates in a longitudinal spline 32 which meets the fuselage at about its longitudinal edge. Spline 32 is preferably made in several sections, as best seen in FIGS. 1 and 3, to accommodate any curvature of the fuselage edge. The air flowing over the airfoil shaped fuselage tends, as with wing tips, to cause vortices at the longitudinal junctions of top and bottom surfaces. On the lifting body, these vortices tend to form along the entire length of the two longitudinal edges. The longitudinal splines 32 have been incorporated, in part, to minimize this vortexing. When retracted, they are turned down and function very much like wing fences. These splines, which serve to increase the underside camber, also tend to create increased lift at higher angles of attack by virtue of the Newtonian effect. At these higher angles of attack air is deflected downward and the equal and opposite reaction produces lift. Further advantage can be taken of these Newtonian effects by permitting each spline to be rotated downwardly as indicated by arrow A along a generally longitudinal axis. Both vortex inhibition and Newtonian lift increase as the splines are extended and turned downwardly. The splines can also be made extendable outwardly from the fuselage as indicated by arrow B as well as being rotatable.

In the retracted configuration, the splines meet the spars and form a substantially continuous fence from the front of the fuselage to the rear. Since the spar is not moveable, in order to provide a continuous fence when the splines are rotated and/or extended, a spline section 32a is provided under each spar.

These high lift advantages and vortex inhibiting characteristics of the splines can be further augmented by providing longitudinal flaps 34, extendable from the splines as indicated by arrows C. The functioning of these flaps is similar to that presently found in trailing edge wing flaps on conventional aircraft. To improve stall characteristics, instead of using one large flap for each spline, multiple flaps can be employed, with slots therebetween similar to that which is found on trailing wing flaps today. Longitudinal flaps 34a are provided under the spars so that when extended the flaps form a continuous fence from front to rear. Flaps as well as splines in the down position enhance the camber and also increase the lifting body span.

In the landing and take-off configurations the splines 32 and 32a would be turned downward and/or extended and the flaps 34 and 34a would be fully extended. This configuration enhances low speed landing capability and facilitates early take-offs, giving the plane improved STOL charateristics. In cruise configuration the splines and flaps may be fully retracted or may be extended (fully or partially) and/or rotated to assist handling and improve maneuverability. Moreover, not all the splines need be activated simultaneously. The same is true of the flaps. They may all be individually controlled. For example, it might be desireable to extend only the forward-most splines and flaps, thereby simulating and gaining some of the advantages of canard wings.

My invention is not intended to supplant other design considerations. Instead, it can be used in conjunction with them. For example, it can be used with straight, tapered, elliptical, swept-back, delta, swept-forward or other wing plan forms. Indeed, swept-forward wings tend to cause increased turbulence at the wing root (due to span-wise flow toward the fuselage) and hence would benefit more than most by incorporation of my invention. The "area rule" considerations (see, for example, U.S. Pat. Nos. 2,874,922 and 2,898,059) need only take into account the unique features of my invention when determining the longitudinal development of cross sectional area of the entire configuration.

I claim:

1. An airplane airframe designed for high subsonic, transonic or supersonic speeds comprising:
   (a) a fuselage structure;
   (b) wings, each having a leading edge, a trailing edge, an inboard end and an outboard end and being connected to said fuselage structure at said inboard end;
   (c) spars intervening between said fuselage structure and said inboard ends of said wings, each such spar having an airfoil configuration, the maximum height of which is substantially less than the maximum height of the wing at or about the inboard end thereof, only one such spar being associated with each of said wings, each such spar forming the only connection between said fuselage structure and the associated wing, each such spar remaining exposed during high speed horizontal flight, and
   (d) wing fences at about the inboard ends of said wings, said wing fences extending from the upper and lower surfaces of said wings over the entire forward to rearward extent thereof.

2. The airplane airframe of claim 1 wherein each of said spars has a chord length substantially less than the chord length of the inboard end of the wing adjacent thereto, the leading edge of each such spar being recessed from the leading edge of the wing adjacent thereto.

3. The airplane airframe of claim 2 wherein said fuselage structure is airfoil shaped thereby forming a lifting body.

4. The airplane airframe of claim 2 further comprising winglets at the outboard ends of the wings.

5. The airplane airframe of claim 4 wherein said fuselage structure is airfoil shaped thereby forming a lifting body.

6. The airplane airframe of claim 4 wherein said winglets are comprised of primary winglets extending forwardly from said trailing edges of the wings and secondary winglets extending rearwardly from said leading edges of the wings.

7. The airplane airframe of claim 6 wherein said fuselage structure is airfoil shaped thereby forming a lifting body.

8. The airplane airframe of claim 6 wherein the primary winglets are moveable in flight between a configuration wherein they are disposed above the respective wings and a configuration wherein they are disposed substantially parallel to the spans of the respective wings.

9. The airplane airframe of claim 8 wherein said fuselage structure is airfoil shaped thereby forming a lifting body.

10. The airplane airframe of claim 6 wherein said primary winglets are moveable in flight between a configuration wherein they are disposed above the respective wings, a configuration wherein they are approximately parallel to the spans of the respective wings, and a configuration wherein they are disposed below the respective wings.

11. The airplane airframe of claim 10 wherein said fuselage structure is airfoil shaped thereby forming a lifting body.

12. The airplane airframe of claim 10 wherein the secondary winglets are moveable in flight between a configuration wherein they are disposed below the respective wings and a configuration wherein they are disposed substantially parallel to the spans of the wings.

13. The airplane airframe of claim 12 wherein said fuselage structure is airfoil shaped thereby forming a lifting body.

14. The airplane airframe of claim 1 further comprising winglets at the outboard ends of said wings.

15. The airplane airframe of claim 14 wherein said winglets are moveable in flight with respect to said wings between planes forming angles of substantially less than 180° with the chord planes of the respective wings, and planes approximately parallel to or in the chord-planes of the respective wings, the range of movement of at least one winglet on each wing including a position in which such winglet makes an angle of approximately 90° with the chord plane of the wing.

16. The airplane airframe of claim 15 wherein said fuselage structure is airfoil shaped thereby forming a lifting body.

17. The airplane airframe of claim 14 wherein said winglets are moveable and wherein in one position they depend downwardly from the wings with zero angle of incidence.

18. The airplane airframe of claim 14 wherein said winglets are comprised of primary winglets extending forwardly from the trailing edges of the wings and secondary winglets extending rearwardly from the leading edges of the wings.

19. The airplane airframe of claim 18 wherein said winglets are moveable and wherein said primary winglets can be aligned with said secondary winglets with zero angle of incidence.

20. The airplane airframe of claim 19 where said aligned primary and secondary winglets depend downwardly from said wings.

21. The airplane airframe of claim 18 wherein said primary winglets are moveable in flight between a configuration wherein they are disposed above the wings, a configuration wherein they are disposed approximately parallel to the span of the respective wings, and a configuration wherein they are disposed below the wings.

22. The airplane airframe of claim 21 wherein the secondary winglets are moveable in flight between a configuration wherein they are disposed below the wings and a configuration wherein they are disposed substantially parallel to the spans of the respective wings.

23. The airplane airframe of claim 18 wherein the primary winglets are moveable in flight between a configuration wherein they are disposed above the wings and a configuration wherein they are disposed substantially parallel to the spans of the respective wings.

24. The airplane airframe of claim 23 wherein the secondary winglets are moveable in flight between a configuration wherein they are disposed below the respective wings and a configuration wherein they are disposed substantially parallel to the spans of the respective wings.

25. The airplane airframe of claim 14 wherein said fuselage structure is airfoil shaped thereby forming a lifting body.

26. The airplane airframe of claim 1 wherein said fuselage structure is airfoil shaped, thereby forming a lifting body, having a leading edge and trailing edge and further characterized by having at least two longitudinal edges.

27. The airplane airframe of claim 26 further comprising longitudinal splines at about said longitudinal edges of said lifting body fusalage structure.

28. The airplane airframe of claim 27 further comprising longitudinal flaps connected to and extendable in flight from said longitudinal splines.

29. The airplane airframe of claim 27 wherein said longitudinal splines are pivotally attached to said fuselage structure.

30. The airplane airframe of claim 29 wherein one or more of said splines can be pivoted independently of others of said splines.

31. The airplane airframe of claim 29 wherein said splines are also extendable in flight outwardly from said fuselage.

32. The airplane airframe of claim 29 further comprising longitudinal flaps connected to and extendable in flight from said longitudinal splines.

33. The airplane airframe of claim 29 wherein when pivoted to a first position said splines together with said spars form substantially continuous fences from about said leading edge to about said trailing edge of said fuselage.

34. The airplane airframe of claim 33 wherein when pivoted to a second position said splines form substantially continuous fences from about said leading edge to about said trailing edge of said fuselage.

35. The airplane airframe of claim 27 wherein said splines are extendable and retractable in flight.

36. The airplane airframe of claim 35 wherein one or more of said splines can be extended independently of others of said splines.

37. The airplane airframe of claim 35 further comprising longitudinal flaps connected to and extendable in flight from said longitudinal splines.

38. The airplane airframe of claim 35 wherein, when retracted, said splines together with said spars form substantially continuous fences from about said leading edge to about said trailing edge of said fuselage.

39. The airplane airframe of claim 38 wherein one or more of said splines can be extended independently of others of said splines.

40. The airplane airframe of claim 38 wherein when extended said splines form substantially continuous fences from about said leading edge to about said trailing edge of said fuselage.

41. The airplane airframe of claim 40 wherein said splines are also extendable in flight outwardly from said fuselage.

42. The airplane airframe of claim 35 wherein the angle between said splines and said fuselage structure is variable and can be changed while in flight from a first position, to a second, position.

43. The airplane airframe of claim 42 further comprising longitudinal flaps connected to and extendable in flight from said longitudinal splines.

44. The airplane airframe of claim 42 wherein when in said first position said splines together with said spars form substantially continuous fences from about said leading edge to about said trailing edge of said fuselage, and wherein when in said second position said splines form substantially continuous fences from about said leading edge to about said trailing edge of said fuselage.

45. An airplane airframe designed for high subsonic, transonic or supersonic speeds comprising:
(a) a fuselage structure;
(b) wings, each having a leading edge, a trailing edge, an inboard end and an outboard end and being connected to said fuselage structure at said inboard end; and
(c) spars fixedly mounted to said fuselage intervening between said fuselage structure and said inboard ends of said wings, each such spar remaining exposed during high speed horizontal flight,
each such spar having an airfoil configuration, the maximum chord length of which is substantially less than the chord length of the wing at or about the inboard end thereof, only one such spar being associated with each of said wings, each such spar forming the only connection between said fuselage structure and the associated wing, the leading edge of each such spar being recessed from the leading edge of the wing adjacent thereto.

46. The airplane of claim 45 further comprising wing fences at about the inboard ends of said wings.

47. The airplane airframe of claim 46 wherein said fuselage structure is airfoil shaped thereby forming a lifting body.

48. The airplane airframe of claim 46 further comprising winglets at the outboard ends of the wings.

49. The airplane airframe of claim 48 wherein said winglets are comprised of primary winglets extending forwardly from said trailing edges of the wings and secondary winglets extending rearwardly from said leading edges of the wings.

50. The airplane airframe of claim 49 wherein said fuselage structure is airfoil shaped thereby forming a lifting body.

51. The airplane airframe of claim 49 wherein the primary winglets are moveable in flight between a configuration wherein they are disposed above the respective wings and a configuration wherein they are disposed substantially parallel to the spans of the respective wings.

52. The airplane airframe of claim 51 wherein said fuselage structure is airfoil shaped thereby forming a lifting body.

53. The airplane airframe of claim 49 wherein said primary winglets are moveable in flight between a configuration wherein they are disposed above the respective wings, a configuration wherein they are disposed approximately parallel to the spans of the respective wings, and a configuration wherein they are disposed below the respective wings.

54. The airplane airframe of claim 53 wherein said fuselage structure is airfoil shaped thereby forming a lifting body.

55. The airplane airframe of claim 53 wherein the secondary winglets are moveable in flight between a configuration wherein they are disposed below the respective wings and a configuration wherein they are disposed substantially parallel to the spans of the respective wings.

56. The airplane airframe of claim 55 wherein said fuselage structure is airfoil shaped thereby forming a lifting body.

57. The airplane airframe of claim 45 further comprising winglets at the outboard ends of the wings.

58. The airplane airframe of claim 57 wherein said fuselage structure is airfoil shaped thereby forming a lifting body.

59. The airplane airframe of claim 57 wherein said winglets are comprised of primary winglets extending forwardly from said trailing edges of the wings and secondary winglets extending rearwardly from said leading edges of the wings.

60. The airplane airframe of claim 59 wherein said primary winglets are moveable in flight between a configuration wherein they are disposed above the respective wings, a configuration wherein they are disposed approximately parallel to the spans of the respective wings, and a configuration wherein they are disposed below the respective wings.

61. The airplane airframe of claim 60 wherein said fuselage structure is airfoil shaped thereby forming a lifting body.

62. The airplane airframe of claim 59 wherein the secondary winglets are moveable in flight between a configuration wherein they are disposed below the respective wings and a configuration wherein they are disposed substantially parallel to the spans of the respective wings.

63. The airplane airframe of claim 62 wherein said fuselage structure is airfoil shaped thereby forming a lifting body.

64. The airplane airframe of claim 59 wherein the primary winglets are movable in flight between a configuration wherein they are disposed above the respective wings and a configuration wherein they are disposed substantially parallel to the spans of the respective wings.

65. The airplane airframe of claim 64 wherein said fuselage structure is airfoil shaped thereby forming a lifting body.

66. The airplane airframe of claim 59 wherein said fuselage structure is airfoil shaped thereby forming a lifting body.

67. The airplane airframe of claim 45 wherein said fuselage structure is airfoil shaped thereby forming a lifting body.

68. An airplane airframe comprising:
(a) an airfoil shaped fuselage having two longitudinal edges and a leading edge and a trailing edge;
(b) wings connected to said fuselage;
(c) longitudinal splines extending outwardly from said fuselage at about said longitudinal edges, said longitudinal splines being moveable so that the angle between said splines and said fuselage can be varied in flight; and
longitudinal flaps extendable in flight from said splines.

69. The airplane airframe of claim 68 wherein said splines and said flaps, when extended, form a substantially continuous fence from about the leading edge of the fuselage to about the trailing edge thereof.

70. An airplane airframe comprising:
(a) an airfoil shaped fuselage having two longitudinal edges and a leading edge and a trailing edge;
(b) wings connected to said fuselage;
(c) longitudinal splines extending outwardly from said fuselage at about said longitudinal edges, said longitudinal splines being moveable so that the angle between said splines and said fuselage can be varied in flight and being extendable in flight outwardly from said fuselage; and
longitudinal flaps extendable in flight from said splines.

71. An airplane airframe comprising:
(a) an airfoil shaped fuselage having an upper surface and a lower surface, having longitudinal edges and being substantially symmetrical about a longitudinal center plane;
(b) wings connected to said fuselage wherein said fuselage is provided with two deep longitudinal cambers cut into said underside thereof symmetrically about said center line;
(c) splines extentable in flight outwardly from said fuselage; and
(d) longitudinal flaps extendable from said splines.

72. An airplane airframe comprising:
(a) an airfoil shaped fuselage having an upper surface and a lower surface, having longitudinal edges and being substantially symmetrical about a longitudinal center plane;
(b) wings connected to said fuselage wherein said fuselage is provided with two deep longitudinal cambers cut into said underside thereof symmetrically about said center line;
(c) splines pivotally mounted on the fuselage; and
(d) longitudinal flaps extendable from said splines.

* * * * *